(12) United States Patent
Wipasuramonton et al.

(10) Patent No.: US 8,376,401 B2
(45) Date of Patent: Feb. 19, 2013

(54) AIRBAG

(75) Inventors: Pongdet Paul Wipasuramonton, Rochester, MI (US); Mark Andrew Steinbach, Clawson, MI (US); James Peter Karlow, Commerce Township, MI (US); David Lloyd Danielson, Midland, MI (US); Todd Matthew Starke, Saint Charles, MI (US); Chad Michael Dinninger, Saint Charles, MI (US)

(73) Assignee: TK Holdings Inc., Auburn Hills, MI (US)

( * ) Notice: Subject to any disclaimer, the term of this patent is extended or adjusted under 35 U.S.C. 154(b) by 114 days.

(21) Appl. No.: 13/013,682

(22) Filed: Jan. 25, 2011

(65) Prior Publication Data

US 2011/0181031 A1 Jul. 28, 2011

Related U.S. Application Data

(60) Provisional application No. 61/298,786, filed on Jan. 27, 2010.

(51) Int. Cl.
*B60R 21/16* (2006.01)

(52) U.S. Cl. .................... 280/743.1; 280/728.1

(58) Field of Classification Search ............... 280/728.2, 280/728.1, 743.1
See application file for complete search history.

(56) References Cited

U.S. PATENT DOCUMENTS

| | | | |
|---|---|---|---|
| 5,006,372 A | 4/1991 | Wolfer et al. | |
| 5,114,180 A | 5/1992 | Kami et al. | |
| 5,687,986 A | 11/1997 | Nelsen et al. | |
| 5,782,489 A | 7/1998 | LaLonde et al. | |
| 5,863,625 A | 1/1999 | Chiou | |
| 5,909,895 A * | 6/1999 | Iino et al. | 280/743.1 |
| 6,113,141 A | 9/2000 | Baker | |
| 6,199,898 B1 * | 3/2001 | Masuda et al. | 280/730.2 |
| 6,220,629 B1 | 4/2001 | Wipasuramonton et al. | |
| 6,355,123 B1 | 3/2002 | Baker et al. | |
| 6,364,356 B1 | 4/2002 | Keshavaraj | |
| 6,435,543 B1 | 8/2002 | Magoteaux et al. | |
| 6,502,853 B2 * | 1/2003 | Keshavaraj | 280/729 |
| 6,520,539 B1 * | 2/2003 | Ritter | 280/743.1 |
| 6,550,890 B2 | 4/2003 | Saijo | |
| 6,585,293 B2 * | 7/2003 | Keshavaraj | 280/743.1 |
| 6,598,902 B2 | 7/2003 | Keshavaraj | |
| 6,712,920 B2 | 3/2004 | Masuda et al. | |

(Continued)

FOREIGN PATENT DOCUMENTS

DE 10 2011 003 18 1 9/2011
EP 1 736 378 B1 4/2008

(Continued)

OTHER PUBLICATIONS

Notice of Allowance mailed Jul. 11, 2012 in U.S. Appl. No. 12/385,145.

(Continued)

*Primary Examiner* — Drew Brown
(74) *Attorney, Agent, or Firm* — Foley & Lardner LLP (57) ABSTRACT

An airbag is provided which includes at least one fabric panel and a structural seam. The structural seam includes an adhesive but does not include stitching. Such stitching tends to weaken the fabric of airbags and causes a higher denier fabric with higher strength to be used to offset the loss in strength, but this in turn produces an airbag of greater weight due to the high denier fabric. By providing an airbag with a structural seam provided by an adhesive without stitching, an airbag may be lighter and may be inflated in less time.

19 Claims, 6 Drawing Sheets

U.S. PATENT DOCUMENTS

| | | | |
|---|---|---|---|
| 6,749,220 B1 | 6/2004 | Wipasuramonton et al. | |
| 6,758,492 B2 | 7/2004 | Tesch | |
| 6,877,768 B2 * | 4/2005 | Fujiwara | 280/730.2 |
| 6,883,826 B2 * | 4/2005 | Fujiwara | 280/730.2 |
| 6,886,857 B1 | 5/2005 | Mishina et al. | |
| 6,886,858 B2 | 5/2005 | Olson | |
| 6,971,665 B2 | 12/2005 | Tanaka | |
| 7,396,041 B2 | 7/2008 | Noguchi et al. | |
| 7,401,805 B2 | 7/2008 | Coon et al. | |
| 7,422,234 B2 | 9/2008 | Huber et al. | |
| 7,537,238 B2 | 5/2009 | Kanuma | |
| 7,581,755 B2 | 9/2009 | Nagai et al. | |
| 7,597,348 B2 | 10/2009 | Fukuda et al. | |
| 7,614,648 B2 | 11/2009 | Heudorfer et al. | |
| 7,648,157 B2 * | 1/2010 | Miwa et al. | 280/728.2 |
| 7,654,567 B2 | 2/2010 | Taylor et al. | |
| 7,658,403 B2 | 2/2010 | Kawabe et al. | |
| 8,132,826 B2 | 3/2012 | Schindzielorz | |
| 2002/0020991 A1 | 2/2002 | Tanase et al. | |
| 2002/0020992 A1 | 2/2002 | Kanuma | |
| 2002/0140211 A1 | 10/2002 | Takahara | |
| 2004/0096673 A1 | 5/2004 | Aketa et al. | |
| 2004/0124615 A1 | 7/2004 | Tanase et al. | |
| 2004/0222618 A1 | 11/2004 | Azechi et al. | |
| 2005/0212270 A1 | 9/2005 | Wipasuramonton et al. | |
| 2006/0046077 A1 | 3/2006 | Howe et al. | |
| 2006/0163853 A1 | 7/2006 | Keshavaraj | |
| 2006/0205908 A1 | 9/2006 | Laur et al. | |
| 2006/0237957 A1 | 10/2006 | Woydick | |
| 2006/0255570 A1 | 11/2006 | Wipasuramonton et al. | |
| 2006/0273558 A1 | 12/2006 | Breed et al. | |
| 2006/0292950 A1 | 12/2006 | Hill | |
| 2009/0179410 A1 | 7/2009 | Schindzielorz | |
| 2010/0244415 A1 | 9/2010 | Wipasuramonton et al. | |

FOREIGN PATENT DOCUMENTS

| | | |
|---|---|---|
| JP | H02-175456 | 7/1990 |
| JP | H02-237837 | 9/1990 |
| JP | 11-227550 | 8/1999 |
| JP | 2011-014059 | 1/2011 |
| WO | WO-99/14082 | 3/1999 |
| WO | WO-2007/070465 A2 | 6/2007 |
| WO | WO-2007/129777 | 11/2007 |

OTHER PUBLICATIONS

Notice of Allowance mailed Nov. 10, 2011 in U.S. Appl. No. 12/318,966.
Office Action mailed Aug. 15, 2011 in U.S. Appl. No. 12/385,145.
Office Action mailed Jan. 20, 2011 in U.S. Appl. No. 12/318,966.
Office Action mailed Jun. 16, 2010 in U.S. Appl. No. 12/385,145.
Office Action mailed Mar. 2, 2011 in U.S. Appl. No. 12/385,145.
Office Action mailed Oct. 18, 2010 in U.S. Appl. No. 12/385,145.
Supplementary European Search Report dated Aug. 25, 2011 in EP Application No. 09701826.1.

* cited by examiner

AIRBAG

CROSS-REFERENCE TO RELATED APPLICATIONS

This application claims priority to and the benefit of U.S. Provisional Patent Application No. 61/298,786, filed Jan. 27, 2010 (incorporated by reference herein in its entirety).

BACKGROUND

The present application relates generally to the field of airbags in automotive vehicles. More specifically, this application relates to an airbag configured to have improved cushion seams to reduce weight and cost, while maintaining strength.

It has been known to construct an airbag for use in a vehicle having an airbag cushion formed by coupling two or more panels together. It has been known to use a seam to couple at least two airbag cushion panels, where the seam includes sewing stitches, typically made of a plurality of stitches made of 400-2400 denier thread or yarn, to reduce or prevent separation (i.e., relative movement) of the coupled panels. It has further been known to apply an adhesive or sealant to the adjacent and interconnected surfaces of the panels to prevent inflation gas from escaping through the plurality of apertures (or holes) created by the plurality of stitches made of thread forming the stitching, as well through the needle holes. These airbags are configured so that the sewing stitches provide the strength or structural integrity of the seam, while the sealant fills and seals the gaps between the airbag cushion panels and stitches. Accordingly, for an optimized design, the airbag is typically configured so that the strength of the stitching and the strength of the panel are substantially similar. To increase the strength of the sewing stitches, the thread diameter or size may be increased, or a material with a higher tensile strength may be used. To increase the strength of the fabric panels of the airbag cushion, a higher denier (i.e., weight) panel may be used or the panel may be made from a higher strength material.

The primary disadvantage of airbags configured using sewing stitches to provide the structural integrity of the seam, is that the sewing stitches produce holes or voids in the fabric panels of the airbag cushion from the sewing needles, which reduce the strength of the airbag panel local to the seam, so the panel must be overdesigned, typically through an increase in fabric thickness (i.e., denier) or in fabric strength, to accommodate this strength degradation at the seam. The panel strength degradation occurs local to the seam when the stitching is applied, since the stitching produces a hole or void in the airbag panel for each pass of the thread or yarn. Each needle hole produces a stress concentration in the panel local to the hole when under load, and often under the high temperature and high stress that the panel is subjected to during deployment, holes will begin to elongate, which propagates tearing of the panel. The reduced strength of the panel local to the stitching influences the entire panel to be designed to accommodate the local high stress seam region, and since the seam area is typically a small percentage of the total cushion area, the panel is overdesigned and inefficient. A seam having sewing stitches, which joins two layers or two panels of the same fabric, has been found to reduce the strength of the panels by 60% relative to a single sheet of the same fabric having no stitching.

SUMMARY

It is advantageous for an airbag to be configured to include an adhesive that can withstand the high stress induced by the separation of the cushion panels caused by the high internal cushion pressure, providing the structural integrity of the seam, which allows for the elimination of the stitching. Thus, the airbag cushion panels may be designed more efficiently to include a lower denier material or smaller size yarns, since the stress concentrations induced by the stitching would be eliminated. The use of adhesive reduces the cost of the airbag cushion by eliminating the cost of the stitching and eliminating the assembly cost of stitching. The use of adhesive also reduces the mass and weight of the airbag system.

According to an embodiment, an airbag can include an inflatable chamber, a fabric panel forming a forming a wall of the inflatable chamber, and a structural seam, wherein the structural seam includes only an adhesive. In other words, the structural seam does not include stitching.

DETAILED DESCRIPTION

Airbag systems (e.g., side-impact, front-impact) are located in vehicles to help protect occupants from injury during a dynamic vehicle event, such as a front-impact, side-impact, or rollover event. An airbag system may include an inflatable airbag cushion that deploys during a dynamic vehicle event and inflates from gas which is rapidly pushed into the airbag cushion by means of an inflator or other gas generating device. An inflator or module may use a device, such as a pyrotechnic device or compressed gas or combination of the two or other airbag inflation device, to generate gas almost instantaneously and to push the gas at a high volumetric flow rate into the inflatable airbag cushion of the airbag system. An airbag cushion or airbag may be stored within and deployed from almost anywhere in the vehicle. For example, airbag cushions may be stored within and deployed from the inboard side (i.e., center mounted side airbag) or outboard (i.e., side airbags) facing surfaces of the seat-back of a seat assembly, from within the dashboard or steering column, or from within the roof-rail of the vehicle. Airbags are typically packaged through a process of folding to compact the airbag in order to fit into the small storage area, such as the seat-back of a seat assembly or roof-rail of a vehicle. Airbags may be used to provide protection to occupants located in any seating row (e.g., first, second, third) of a vehicle. Airbags include side curtain airbags, side airbags, knee airbags and bolsters, passenger airbags, driver side airbags, and other airbags used in the art. The present invention may be used with any of these types of airbags. Those skilled in the art will recognize that the airbags and airbag systems discussed herein may be included with any airbag or airbag system and are not limited by the examples or illustrations discussed herein.

Figure 1:
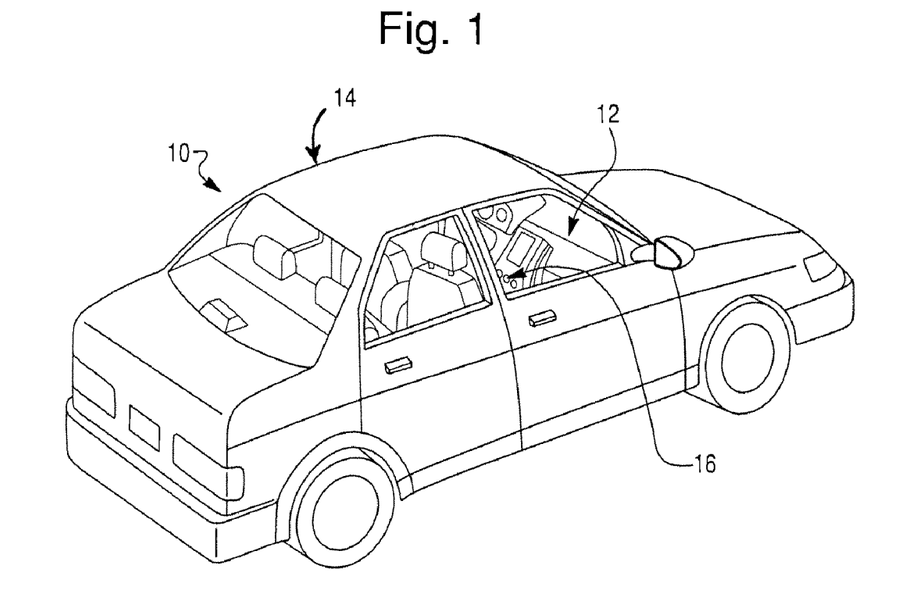
FIG. 1 is a perspective view of an exemplary embodiment of an automotive vehicle which includes an embodiment of airbag.
Figure 2:
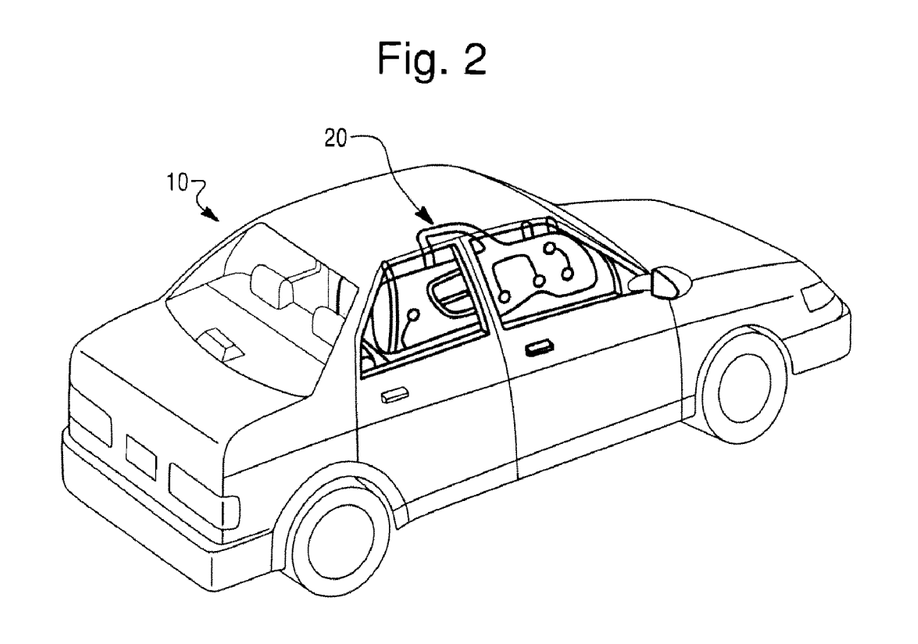
FIG. 2 is a perspective view of the automotive vehicle of FIG. 1 with the airbag deployed.

With reference to FIG. 1, an exemplary embodiment of an automotive vehicle 10 is illustrated. The vehicle 10 can have an interior compartment 12, a driver side 14, and a passenger side 16. The vehicle 10 can further an airbag according to the present invention. For example, the vehicle 10 can include a side-curtain airbag 20 to provide protection to the passenger side front and rear occupants of the vehicle, which is shown as deployed in the example of FIG. 2.

Figure 3:
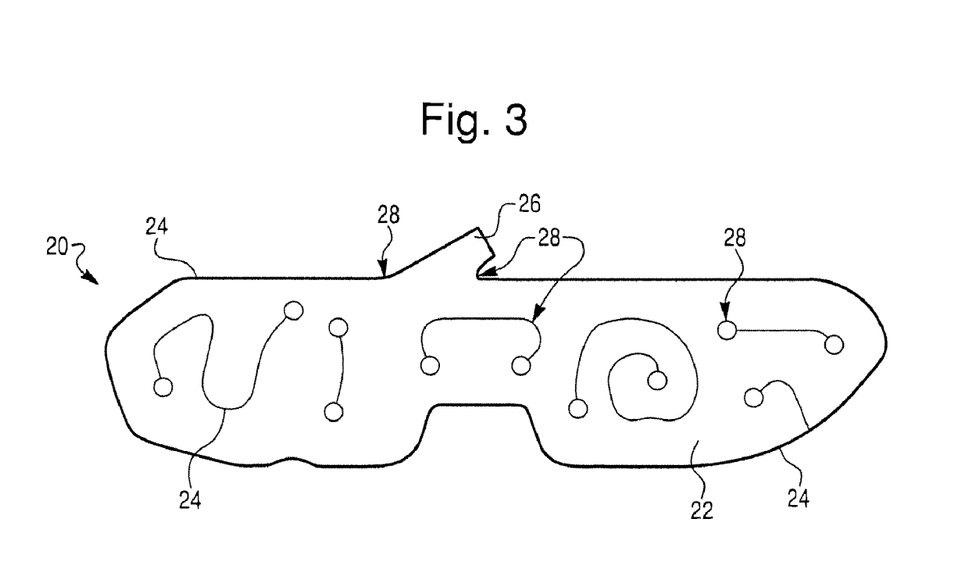
FIG. 3 is a profile view of an exemplary embodiment of a side-curtain airbag cushion for use in a vehicle, such as the vehicle of FIG. 1, and configured to include at least one structural seam.

With reference to FIG. 3, an example of a side-curtain airbag 20 for use in a vehicle is illustrated prior to folding and installation into the vehicle. As shown in the example of FIG. 3, a side-curtain airbag 20 can include an airbag cushion 22 with an inflatable chamber and an inflator (not shown) to inflate the inflatable chamber of the airbag cushion 22 by generation of, or the release of, inflation gas. The side-curtain airbag 22 may be stored within and deployed from the roof-rail of the vehicle. According to an example, the airbag cushion 22 includes an inner panel coupled to an outer panel by at least one structural seam 24 (or structural adhesive seam), with the inner panel and the outer panel forming a forming a wall of the inflatable chamber. According to other examples, an airbag cushion may include any number of panels coupled together using any number of structural seams. The airbag cushion may further include an inflator coupling 26 to attach the cushion to the inflator.

A structural seam, which may be used in any of the airbags discussed herein, includes adhesive to join airbag portions, such as to join two different airbag panels together or simply to join two portions of airbag fabric together. The structural seam does not include stitching and may be limited to only an adhesive.

According to an example, the airbag cushion (which may be any type of airbag discussed herein) includes an inflatable chamber and may be formed from one or more fabric panels which form(s) a wall of the inflatable chamber. For example, an airbag can include an inner panel coupled to an outer panel by a structural seam that runs substantially the entire periphery of the airbag cushion, which defines both the unfolded area of the airbag cushion prior to installation and the deployed volume of the airbag cushion filled by the inflation gas during deployment. According to another example, the structural seam 24 may be located within an interior of the airbag that is inflated, as shown in the example of FIG. 3, in addition to the structural seam 24 on the peripheral edge joining panels or as an alternative. In addition, high stress locations 28, as shown in the example of FIG. 3, can include structural seams as discussed herein.

Such airbag panels may be made from any suitable denier of woven fabric material having a fabric tensile strength tailored to the requirements and geometry of the cushion. Due to the lack of stitching in the structural seam of adhesive, lower denier fabrics may be advantageously used in this invention, which advantageously provide airbags with lower weight and provide weight savings to vehicle and improved fuel economy. Conventional airbags which include stitching in the seam of the airbag weakens the fabric of the airbag, which causes the airbag to require a higher denier (which has a higher strength) to offset this weakening effect of the stitching. However, although higher denier fabrics provide higher strength, the higher denier fabrics also have increased weight and produce airbags that weigh more than airbags made from lower denier fabrics.

For example, a tensile test of 420 denier fabric with a weave-count of 46×46 yarn per 25 mm square without stitching exhibits a tensile strength of about 3000 N/50 mm, while a 420 denier fabric sewn with size 138# sewing threads exhibits a tensile strength of about 1200 N/50 mm. This example demonstrates the weakening effect of stitching in the fabric used for airbag panels, which is normally offset by using higher denier fabrics which have higher strengths than lower denier fabrics.

Airbag panels according to this invention can have a denier of, for example, 100 to approximately 420 denier, or more particularly 100 to less than 400 denier, 100 to 315 denier, or 100 to 210 denier. Even more particularly, the airbag panels can have a denier of 420 denier, 315 denier, 210 denier, or 100 denier. The airbag panels may be made from a material having a fabric tensile strength of 1200 N per 50 mm (1200 N/50 mm), 800 N/50 mm, or lower than 800 N/50 mm. Those skilled in the art will recognize that the airbag panels may be configured to have a varying fabric tensile strength, which may be tailored to meet a specific application and may be configured depending on the seam strength required. The fabric airbag panels may be cut in the flat to form any suitable or required shape, such as those shown in the drawings. The fabric material may be nylon or any other material used in the art.

An airbag panel may further include a coating. The coating may be high temperature resistant, and may be an elastomer, a silicone, an acrylic, a polyurethane, or other suitable material. The coating can fill the openings (or voids) formed between the woven yarns (or fibers) of the woven fabric panels, to prevent or substantially reduce high pressure inflation gas from escaping through the porosity of the woven panels during deployment of the airbag. The coating may be applied to both sides of an airbag panel or selectively applied on only one side.

Figure 4:
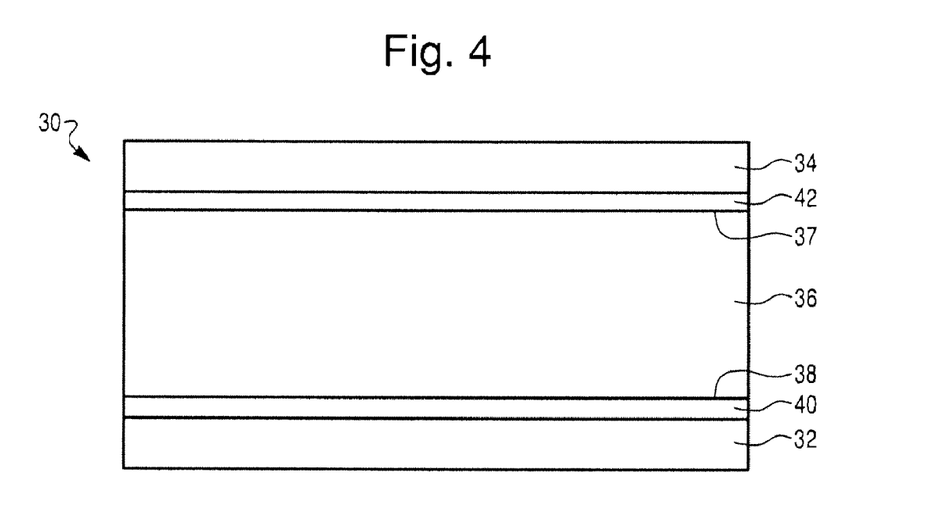
FIG. 4 is a sectional view of an exemplary structural seam with coating layers on the inner surfaces of an airbag.

As shown in the example of FIG. 4, an airbag can include structural seam 30 formed by an inner fabric panel 32, an outer fabric panel 34, and a layer of adhesive 36. The inner panel 32 may include an outside surface (i.e., the surface of the inner panel 32 that is opposite to the layer of structural adhesive 36) that is uncoated and an inside surface having a coating 40 which contacts a bottom surface 38 of the adhesive 36. The outer airbag panel 34 may include an outside surface that is uncoated and an inside surface having a coating 42 which contacts with and may be coupled to the top surface 37 of the structural adhesive 36, as shown in the example of FIG. 4. The structural adhesive thus forms the structural seam without stitching, coupling the inner 32 and outer panels 34 together through the structural adhesive 36. One method used to construct such a structural seam, such as the seam shown in the example of FIG. 4, is to first apply the layer of structural adhesive 36 to the inside surface of the inner panel 32. The inside surface of the outer panel 34 may be positioned to contact the top surface 37 of the structural adhesive 36. An energy source (e.g., heat, radio frequency) may then be applied to the structural seam 30 to cure (or excite) the structural adhesive 36 of the structural seam 30 to improve bonding between the coated panels and the structural adhesive. Pressure may also be applied to the outside surfaces of the cushion panels to compress the seam prior to applying energy source to further improve the bonding of the panels to the structural adhesive.

Figure 5:
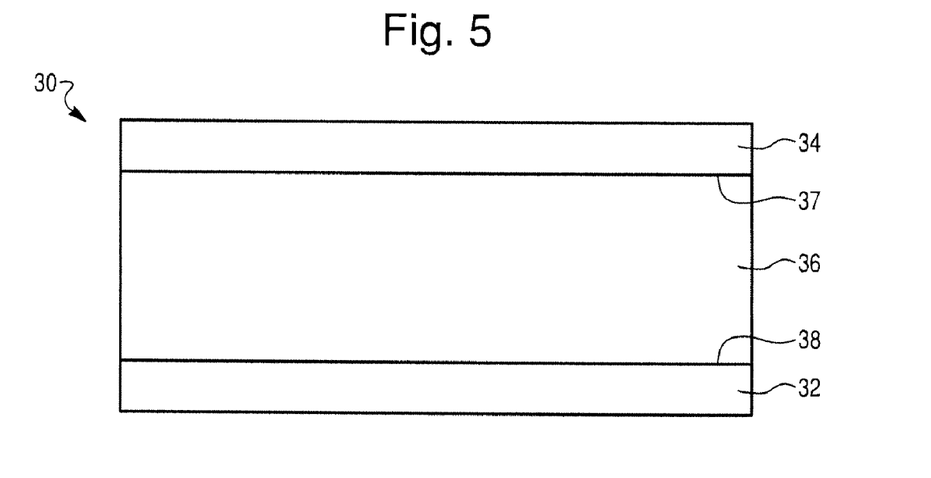
FIG. 5 is a sectional view of an exemplary structural seam without coating layers.

FIG. 5 shows another example of a structural seam 30 for an airbag that includes an inner panel 32, an outer panel 34, and an adhesive 36 but without coating layers, such that the top surface 37 of the adhesive 36 is in direct contact with, and can bond to, the outer panel 34, and the bottom surface 38 of the adhesive 36 is in direct contact with, and can bond to, the inner panel 32. Thus, the inner and outer panels may be directly coupled together using an intervening layer of structural adhesive 36, as shown in the example of FIG. 5.

Figure 6:
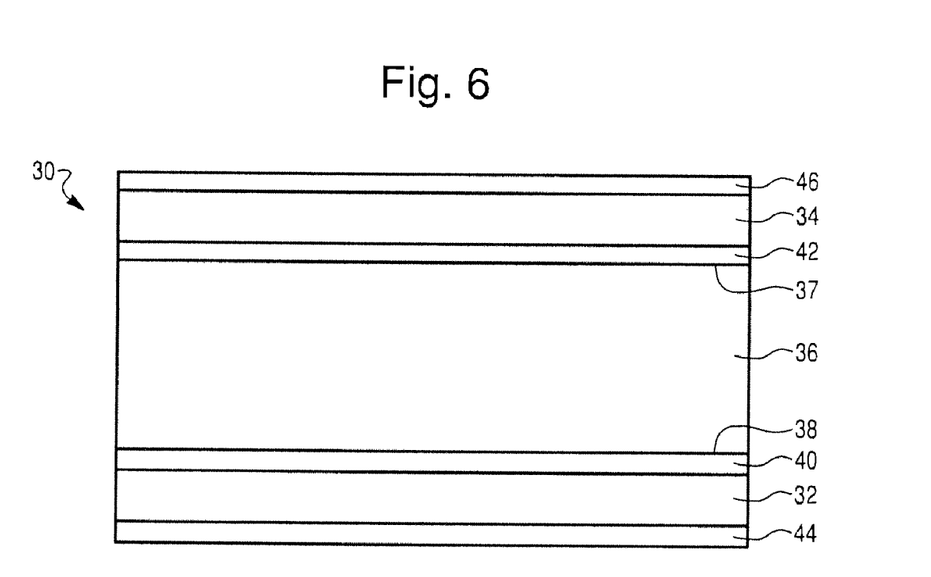
FIG. 6 is a sectional view of an exemplary structural seam with coating layers on the inner and outer surfaces of an airbag.

According to another exemplary embodiment, both the outer and inner panels may include a coating on both the inside and outside surfaces. FIG. 6 shows another example of a structural seam 30 for an airbag that includes an inner panel 32, an outer panel 34, and an adhesive 36 with coating layers, such that both the outer and inner surfaces of the airbag panels have layers of coating. In the example of FIG. 6, the outer surface of the inner panel 32 has a layer of coating 44 and the inner surface of the inner panel has a layer of coating 40, while the outer panel 34 has a layer of coating 42 on its inner surface and a layer of coating 46 on its outer surface. Thus, the inner and outer panels may be coupled together using an intervening layer of structural adhesive, as shown in the example of FIG. 6.

The structural seam may be configured to include a layer of structural adhesive. Such a layer of adhesive may be provided, for example, as an intervening layer between portions or panels of airbag fabric to couples the fabric portions or panels of a cushion. The layer of structural adhesive may be made of heat-cured silicone, high consistency rubber, another suitable material (e.g., acrylic, polyurethane), or any combination of the materials. The structural adhesive may be applied to both panels simultaneously, or the structural adhesive may be first applied to a first panel, such as the inner panel, then a second panel, such as the outer panel, may be coupled to (e.g., brought into contact with) the structural adhesive opposite to first panel. Additionally, a process that input energy may be utilized to facilitate or improve curing of the structural adhesive, which bonds the cushion panels and forms the structural seam. According to an example, the energy source may be input in the form of heat, such as from a heat press, which may be used in conjunction with compressive pressure to ensure proper contact between the panels and the structural adhesive. According to another example, the energy source may be input in the form of waves, such as radio frequency or microwaves. This example may replace a curing chamber or device requiring a controlled temperature, duration of application with a wave emitting device to cure the structural adhesive bonds, which may be more conducive to manufacturability and increase thru-put by being more efficient. According to another example, pressure may be used to improve bonding of the adhesive to the airbag cushion panels. Pressure may be used alone or in conjunction with another curing enabler, such as radio waves or heat, to improve curing. For example, the structural seam may have a predetermined pressure with or without a curing enabler applied for a predetermined period of time to facilitate curing and intimate surfaces of the layer of structural adhesive. Additionally, curing of the layer of structural adhesive may be induced at room temperature merely from time; may be induced from moisture, such as an increased humidity; may be induced by radio frequency, such as when using polyurethane or neoprene materials; or may be induced by pressure, such as when using pressure sensitive materials (such as, for example, acrylic).

Figure 7:
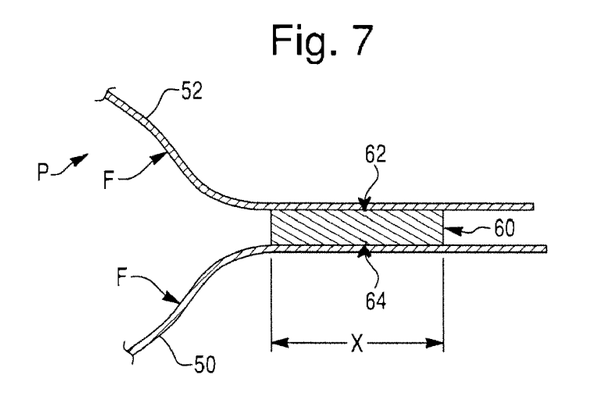
FIG. 7 is a sectional view of an exemplary structural seam.

The structural seam or layer of structural adhesive described herein may have an asymmetrical or varying cross-sectional shape or may be provided in more than one portion that may be tailored to meet specific customer requirements. FIG. 7 shows an example of a cross-section of an airbag which includes fabric layers F of an inner panel 50 and an outer panel 52 joined by a structural adhesive 60, which contacts and adheres to the outer panel 52 at the top surface 62 of the adhesive and contacts and adheres to the inner panel 50 at the bottom surface of the adhesive 64. The structural seam formed by the layer of structural adhesive 60 may have a cross-section substantially rectangular in shape, such as shown in the example of FIG. 7. The width X of the adhesive 60 may be adjusted or varied to tailor the structural seam, such as to adapt the structural seam to the rapid inflation of the airbag and the rapid separation between the inner panel 50 and the outer panel 52 when the airbag is inflated by inflation gas on the pressure side P of the airbag.

The width of the layer of structural adhesive (i.e., the length of the top and bottom surfaces) may be tailored based on the strength requirements for the airbag, such as to sustain the internal cushion pressure induced by the inflation gas, which may vary. For example, the width X of the layer of structural adhesive may be between 3 mm and 25 mm. During airbag deployment, the internal pressure of the airbag cushion increases rapidly due to the sudden influx of inflation gas from the pressure side P of the airbag, inducing increasing separation forces at the structural seam between the inner and outer panels, thus creating high stresses imparted into the structural seam at a relatively high rate (i.e., between the structural adhesive and each coupled panel).

Figure 8:
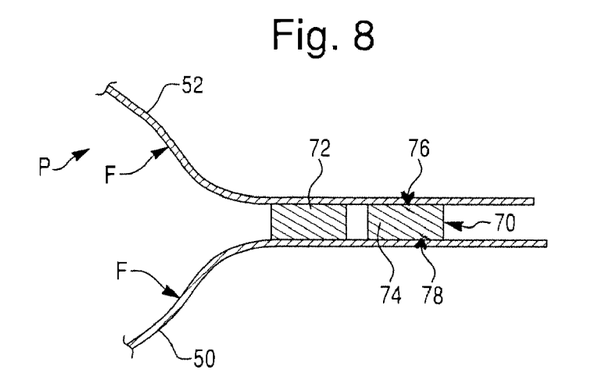
FIG. 8 is a sectional view of an exemplary structural seam formed by two portions of adhesive.

According to an example, a layer of structural adhesive 70 may be configured to include a plurality of beads, as shown in the example of FIG. 8. A top surface 76 of the adhesive 70 can contact and adhere to the outer panel 52 and a bottom surface 78 of the adhesive 70 can contact and adhere to the inner panel 50 of an airbag. As shown in the example of FIG. 8, the layer of adhesive 70 can include a first bead 72 of adhesive closer to an interior of an airbag and a second bead 74 closer to an exterior and outer peripheral edge of the airbag, although other configurations and numbers of beads may be used, such as, for example, three, four, or more beads. Each bead can have the shapes and widths described herein and the total width of the adhesive may be the same width or more as the adhesive example shown in FIG. 7, such as, for example, a width of 3-25 mm or more. The beads may be made from the same adhesive or may be made from different adhesives. For example, the first bead 72 positioned closer to the interior of the airbag and exposed to inflation gases may be made of an adhesive which has relatively higher heat resistance than the adhesive of the second bead 74, which may be shielded from the inflation gases by the first bead 72. For example, the first bead 72 may be made of a silicone adhesive and the second bead 74 may be made of an acrylic adhesive. In addition, the inner bead 72 may be designed to absorb a substantial portion of the stress induced by the inflation of the airbag and the rapid separation of the inner and outer panels, with the second bead 74 acting to absorb the remainder of the stress. In this way, the first or inner bead can even serve as a sacrificial layer to bear the brunt of the inflation forces with the outer bead or remaining beads serving to maintaining the structural seam. The structural seam described in this example may provide a higher strength relative to a structural seam having an asymmetric or varying cross-section, as described below. The plurality of beads may be configured in series, whereby one bead is substantially adjacent to one or two other beads, and the beads may be spaced apart from one another with a gap between the beads or adjacent and in contact with one another.

Figure 9:
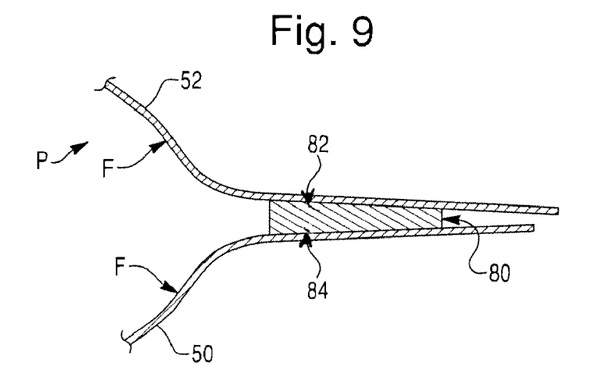
FIG. 9 is a sectional view of an exemplary structural seam with an asymmetrical shape.

According to another example, the layer of structural adhesive may have an asymmetrical or varying cross-section, such as shown in the example of FIG. 9, which shows an example of an adhesive 80 with a top surface 82 in contact with and adhering to a first panel 52 and a bottom surface 84 in contact with and adhering to a second panel 50. Such an adhesive 80 may provide a higher strength relative to the rectangular configured layer. As shown in the example of FIG. 9, the adhesive can have a substantially trapezoidal shape, with the thickness of the adhesive decreasing from the interior of the airbag to the exterior of the airbag.

The high stress induced into the structural seam during airbag deployment requires a structural adhesive that has both high strength and high adhesion characteristics to withstand the high separation and peel forces. The structural adhesive (such as, for example, high consistency rubber, heat cured silicone) may be configured specifically for the fabric yarn used to construct airbag cushions that remain uncoated or specifically for airbag cushions that are coated to have high strength and high adhesion characteristics, which is necessary to couple airbag panels together. The structural adhesive provides the structural integrity of the seam and allows for the elimination of the sewing stitches that conventional airbags use to provide the structural coupling between the airbag panels. The elimination of the stitching eliminates the stress concentrations induced by the needle holes formed in the airbag cushion panels by the process of sewing the stitches, and therefore allows for a reduction in the denier of the panels. Thus, the structural adhesive permits a more efficient airbag design by eliminating the stress concentrations caused by stitching, which weaken the seam area of cushion panels. The stress concentrations may be eliminated or minimized by eliminating the sewing stitches which cause the stress concentrations. The lower denier panels have lower mass, which may in turn reduce the deployment time of the airbag cushion. For example, an airbag cushion configured to include panels of lower denier fabric and a structural adhesive to provide the strength of a structural seam to couple panels of the airbag cushion may deploy quicker relative to a conventional panel made of heavier denier fabric configured to provide the same inflatable volume and configured with the same inflator, and may still provide the same relative cushion strength (i.e., withstand substantially similar separation forces). The lighter or lower fabric denier for lower overall mass is deemed desirable by vehicle manufacturers to increase vehicle mileage, which is mandated by the U.S. government through the CAFE (Corporate Average Fuel Economy) Standard.

The structural adhesive of the structural seam may be made of other materials, and according to an exemplary embodiment, may be configured to be sufficiently strong to withstand the loads from airbag inflation. For example, an airbag constructed with panels having a peel strength of 800 N/50 mm to withstand the deployment loads, may be configured to have a structural seam tensile strength of at least 800 N/50 mm. In addition, the adhesive may be stronger than the coupled adjacent panels of the airbag cushion. Those skilled in the art will recognize that this configuration is not meant as a limitation, but merely expresses one configuration and the airbag cushions having structural adhesive seams may be tailored to having varying strengths to meet varying customer requirements. An airbag configured to have the coupled panels of the structural seam as the weakest strength portion, allows for the optimal configured cushion weight, which provides the most efficient configuration.

Figure 10:
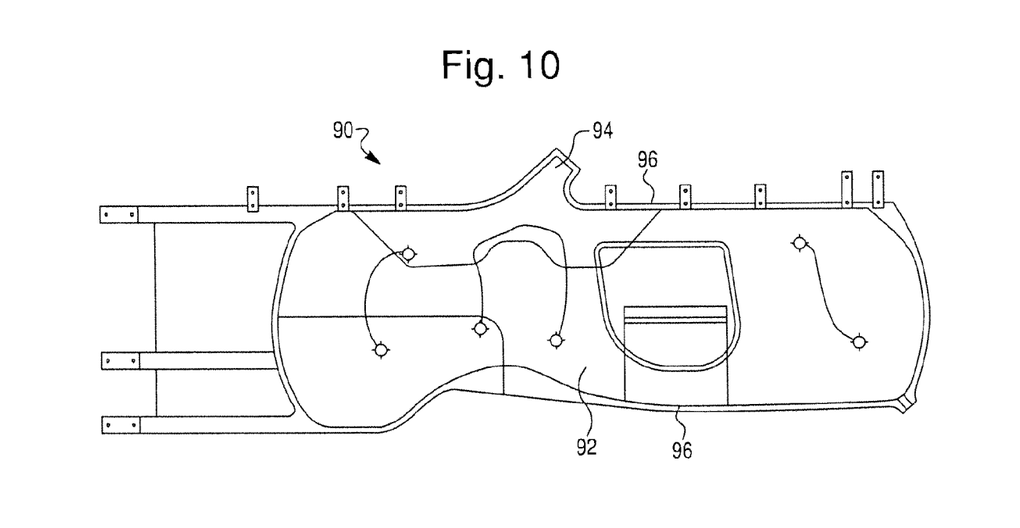
FIG. 10 is a side view of another example of a side-curtain airbag cushion for use in a vehicle, such as the vehicle of FIG. 1, and configured to include at least one structural seam.

As described herein, the structural seam may be used in various airbags used in the art. As shown in the example of FIG. 10, a side-curtain airbag 90, which may be stored within and deployed from the roof-rail of a vehicle, such as the vehicle of FIG. 1, is illustrated prior to folding and installation into the vehicle. The side-curtain airbag 90 may include an inflator (not shown) coupled to an inflator coupling 94 to provide inflation gas to the airbag cushion 92, which includes an inner panel coupled to an outer panel by a structural seam 96 that runs substantially the entire periphery of the airbag cushion and also at the internal tether inside the cushion. The structural seam 96 can define both the unfolded area of the airbag cushion prior to installation and the deployed volume of the airbag cushion filled by the inflation gas during deployment. The airbag cushion panels may be made from a conventional material and may be coated or uncoated.

Figure 11:
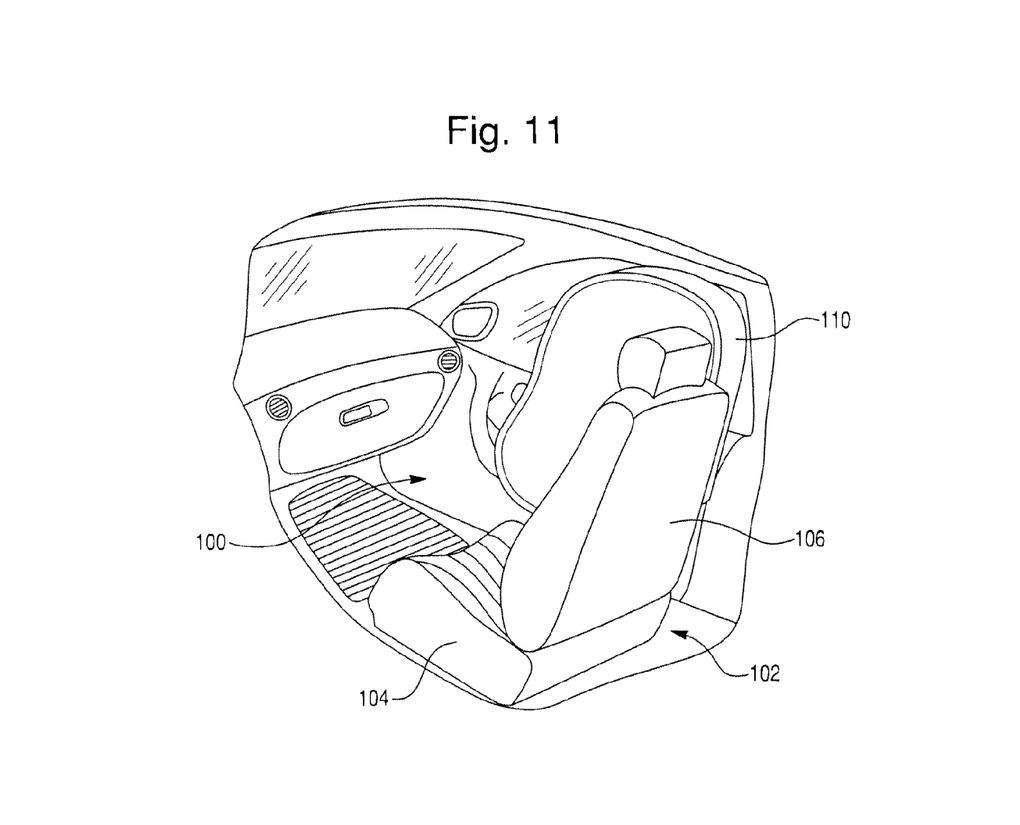
FIG. 11 is a perspective view of a passenger side of the interior compartment of a vehicle, such as the vehicle of FIG. 1, illustrating a side-impact airbag deployed from the outboard side of the seat.

FIG. 11 shows an example of a passenger side 100 of automotive vehicle. The passenger side 100 of the vehicle may include a seat 102, which includes a seat cushion 104 and a seat back 106. According to an example, the seat back 106 further includes a side-impact airbag module or system 110 that may be stored in and deployed from the seat-back, such as the side of the seat back, as shown in FIG. 11.

Figure 12:
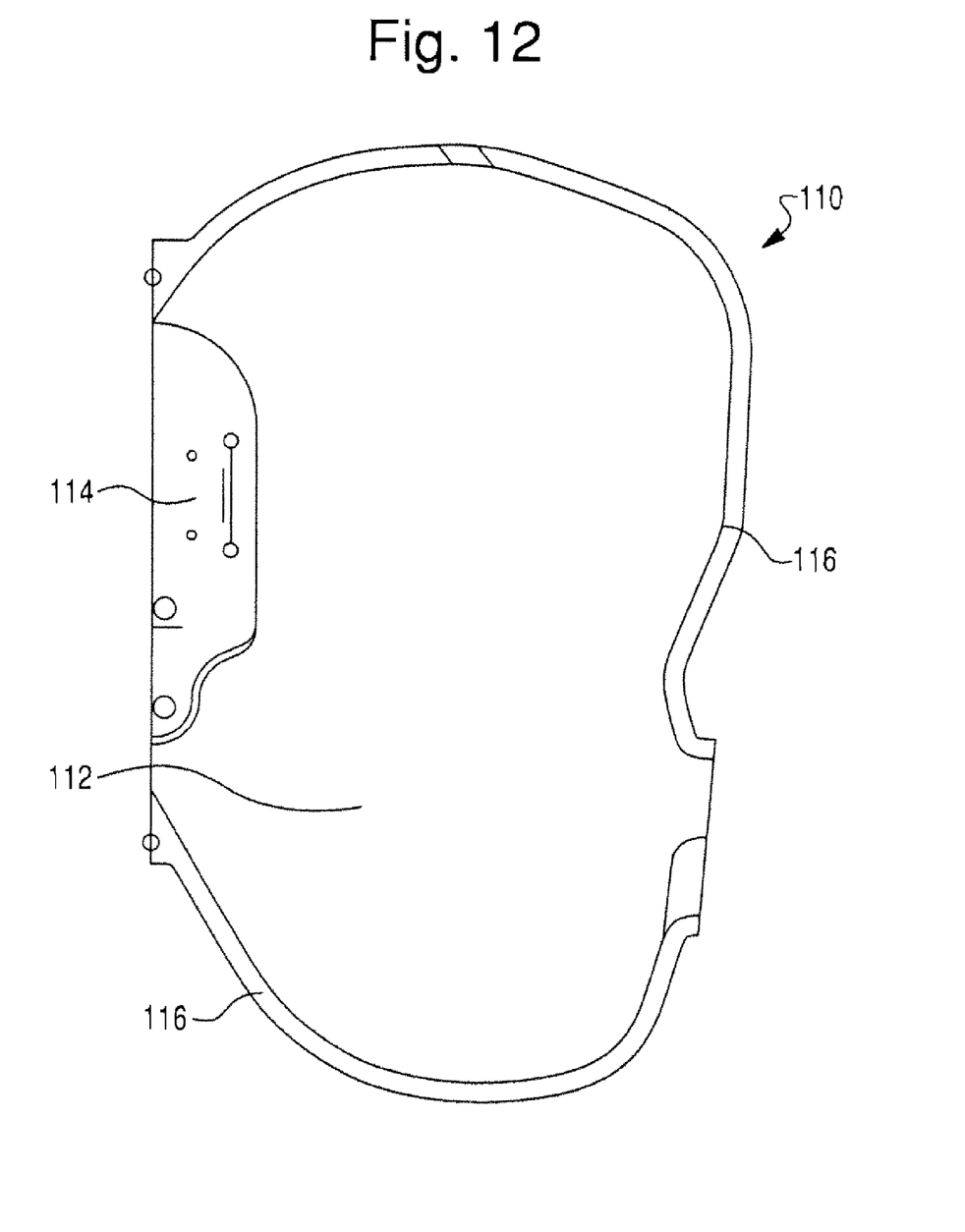
FIG. 12 is a side view of an example of a side-impact airbag for use in a vehicle, such as the vehicle of FIG. 4, which includes at least one structural seam.

FIG. 12, is a profile view of an exemplary side-impact airbag 110, which may be stored within and deployed from the seat of the vehicle, and is illustrated prior to folding and installation into the vehicle. The side-impact airbag 110 may include a cushion 112, an inflator (not shown) connected to an inflator coupling 114 to inflate the airbag cushion 112 by generation or release of inflation gas. The cushion 112 can include at least one panel coupled by a structural seam 116 that runs substantially the entire periphery of the airbag cushion 112, which defines both the unfolded area of the airbag cushion prior to installation and the deployed volume of the airbag cushion filled by the inflation gas during deployment. The airbag cushion panels may be made from a conventional material and may be coated or uncoated, as described herein.

The structural seams described herein may be configured to include any number of layers of structural adhesive coupled between any number of panels of the airbag cushion. The layers (e.g., serial layers) of structural adhesive may be applied to both panels simultaneously, or the layers of structural adhesive may be first applied or coupled to a first panel, then a second panel may be coupled to the coupled first panel and structural adhesive. The layers of structural adhesive may be made of silicone, acrylic, or other useful material that has the required adhesion and strength properties. Each layer of structural adhesive may have a cross-section substantially rectangular in shape (as shown in the examples of FIG. 7 and FIG. 8), which includes a top surface to adhere to the inner surface of the outer panel of the cushion and a bottom surface, which is configured opposite to the top surface, to adhere to the inner surface of the inner panel of the cushion. The width of each layer of structural adhesive (i.e., the length of the top and bottom surfaces) may be tailored based on the strength requirements for the airbag, such as the strength required to sustain a certain internal cushion pressure and rapid separation of panels during deployment. A layer of structural adhesive may be positioned proximate to or in contact with an adjacent layer of structural adhesive, or may be positioned such that there is a gap between the adjacent layers of structural adhesive. Furthermore, the structural adhesive layers may be made of different grades of adhesive, such as different grades of silicone adhesive.

The structural seam may be configured to include at least one layer of structural adhesive coupled between at least one panel of the cushion. According to an example, the structural seam may be configured to include one layer of structural adhesive coupled between any two panels of the airbag cushion. The layers of structural adhesive may be made of silicone, acrylic, or other suitable bondable material that has the required adhesion and strength properties. A layer of structural adhesive may have any useful cross-sectional shape, such as substantially trapezoidal shaped (as shown in the example of FIG. 9), which includes a top surface to adhere to the inner surface of a first panel of the cushion and a bottom surface, which is configured opposite to the top surface, to adhere to the inner surface of a second panel of the cushion. The top surface of the layer of structural adhesive may form any angle relative to the bottom surface of the layer of structural adhesive, to accommodate airbag configurations where the panels are offset by a relative angle.

Those skilled in the art will recognize that the structural seams with structural adhesive disclosed herein are not limited to side-impact and side-curtain airbags and may be configured for use in any airbag. Additionally, the structural seams with structural adhesive disclosed herein are configured to have high adhesion characteristics to couple airbag panels, even when the airbag panels may be coated with a material that resists adhesion. The structural seams with structural adhesive are configured to provide the structural integrity of the seam, therefore eliminating the need to include sewing stitches, which conventional airbags use to provide the structural coupling between the airbag panels. The elimination of the sewing stitches eliminates the stress concentrations induced by the needle holes formed in the airbag cushion panels by the process of sewing, and therefore allows for a reduction in the mass of the panels, which in turn reduces cost. Thus, the structural adhesive permits a more efficient airbag design by eliminating the stress concentrations that weaken the seam area of cushion panels.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag for protecting a vehicle occupant, comprising:
   inner and outer fabric panels connected at a structural seam to form an inflatable chamber,
   wherein the structural seam forms a boundary of the inflatable chamber and includes:
      first and second coatings, the first coating directly adjacent to the inner fabric panel and a second coating directly adjacent to the outer fabric panel,
      an adhesive located between a third coating and a fourth coating, the third coating being directly adjacent to the inner fabric panel and the adhesive, and the fourth coating being directly adjacent to the outer fabric panel and the adhesive, and
   wherein the first coating, second coating, third coating, fourth coating and adhesive comprise silicone.

2. An airbag for protecting a vehicle occupant, comprising:
   an inflatable chamber;
   a fabric panel forming a wall of the inflatable chamber; and
   a structural seam located on the fabric panel and forming a boundary of the inflatable chamber, wherein the structural seam includes only an adhesive,
   wherein the structural seam includes at least two beads of adhesive, and
   wherein one of the beads is located adjacent the inflatable chamber and is configured to be exposed to inflation gases used to inflate the airbag and comprises an adhesive having a greater heat resistance than the adhesives of other beads.

3. The airbag of claim 2, wherein the fabric panel has a denier from approximately 100 to less than 400.

4. The airbag of claim 3, wherein the fabric panel has a denier from approximately 100 to 315.

5. The airbag of claim 3, wherein the fabric panel has a denier of approximately 210.

6. The airbag of claim 2, wherein the adhesive has an asymmetrical cross-section.

7. The airbag of claim 2, wherein the airbag comprises a second fabric panel and the structural seam is located at an edge of the airbag where the at least two fabric panels are joined together.

8. The airbag of claim 2, wherein the structural seam is surrounded by the inflatable chamber.

9. The airbag of claim 2, further comprising a coating applied to the fabric panel, wherein the coating is in direct contact with the adhesive.

10. The airbag of claim 2, wherein the adhesive is in direct contact with the fabric panel.

11. An airbag for protecting a vehicle occupant, comprising:
  an inflatable chamber;
  a fabric panel forming a wall of the inflatable chamber; and
  a structural seam located on the fabric panel and forming a boundary of the inflatable chamber, wherein the structural seam includes only an adhesive,
  wherein the structural seam includes at least two beads of adhesive, and
  wherein one of the beads is located adjacent the inflatable chamber and is configured to be exposed to inflation gases used to inflate the airbag and comprises an adhesive having a greater resistance to rapid separation than the adhesives of other beads.

12. The airbag of claim 11, wherein the fabric panel has a denier from approximately 100 to less than 400.

13. The airbag of claim 12, wherein the fabric panel has a denier from approximately 100 to 315.

14. The airbag of claim 12, wherein the fabric panel has a denier of approximately 210.

15. The airbag of claim 11, wherein the adhesive has an asymmetrical cross-section.

16. The airbag of claim 11, wherein the airbag comprises a second fabric panel and the structural seam is located at an edge of the airbag where the at least two fabric panels are joined together.

17. The airbag of claim 11, wherein the structural seam is surrounded by the inflatable chamber.

18. The airbag of claim 11, further comprising a coating applied to the fabric panel, wherein the coating is in direct contact with the adhesive.

19. The airbag of claim 11, wherein the adhesive is in direct contact with the fabric panel.

* * * * *